(12) United States Patent
Booyens et al.

(10) Patent No.: US 7,813,044 B1
(45) Date of Patent: *Oct. 12, 2010

(54) MICRO-LENS ENHANCED ELEMENT

(75) Inventors: Harry Booyens, North Vancouver (CA); Murray Figov, Ra'anana (IL); Daniel J. Blondal, Vancouver (CA); Paul R. West, Fort Collins, CO (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/414,738

(22) Filed: Mar. 31, 2009

(51) Int. Cl.
*G02B 27/10* (2006.01)
(52) U.S. Cl. .................................. 359/619; 359/620
(58) Field of Classification Search ......... 359/619–624; 355/33; 353/32
See application file for complete search history.

(56) References Cited

U.S. PATENT DOCUMENTS

| | | | |
|---|---|---|---|
| 5,330,799 | A | 7/1994 | Sandor et al. |
| 5,460,679 | A | 10/1995 | Abdel-Kader |
| 5,715,383 | A | 2/1998 | Schindler et al. |
| 5,908,505 | A | 6/1999 | Bargenquest et al. |
| 6,298,780 | B1 | 10/2001 | Ben-Horin et al. |
| 6,409,331 | B1 | 6/2002 | Gelbart |
| 6,546,872 | B1 | 4/2003 | Huffer et al. |
| 6,755,519 | B2 | 6/2004 | Gelbart et al. |
| 2006/0285215 | A1* | 12/2006 | Wu ............................ 359/619 |
| 2008/0302262 | A1 | 12/2008 | Pinto et al. |

FOREIGN PATENT DOCUMENTS

EP        922 572 A1    6/1999

OTHER PUBLICATIONS

Simard et al.; Soluable, Infrared-Absorbing Croconate Dyes from 2,6-Di-tert-butyl-4-methylchalcogenpyrylium Salts; J. Org. Chem, 2000, 65, pp. 2236-2238.

* cited by examiner

*Primary Examiner*—Joseph Martinez
(74) *Attorney, Agent, or Firm*—Nelson Adrian Blish

(57) ABSTRACT

A micro-lens enhanced element comprises a substrate bearing sequences of printed image elements, each sequence containing image elements from more than one image. A transparent spacer layer is coated over the interlaced image strips. Lenticular lenses are fashioned over each sequence of image elements by deposition of a transparent layer of low surface energy polydimethyl siloxane based material and ablation of the same to create strips of material adhesive to a polymeric lens forming material between consecutive sequences of printed image elements. During deposition of a liquid lens forming material, the liquid withdraws from the liquid adhesive low surface energy strips to form a meniscus, thereby providing lenticular lenses. The transparent low surface energy material comprises a near infrared dye with low absorption in the visible range of the spectrum to render the material both transparent and ablateable by infrared laser.

19 Claims, 14 Drawing Sheets

MICRO-LENS ENHANCED ELEMENT

CROSS REFERENCE TO RELATED APPLICATIONS

Reference is made to commonly-assigned copending U.S. patent application Ser. No. 11/950,877, filed Dec. 5, 2007, entitled MICRO-LENS ENHANCED ELEMENT, by Blondal et al.; and U.S. patent application Ser. No. 12/414,732, filed Mar. 31, 2009, entitled MICRO-LENS ENHANCED ELEMENT, by Figov et al.; the disclosures of which are incorporated herein.

FIELD OF THE INVENTION

The invention relates to methods and apparatuses forming micro-lens enhanced images and surfaces.

BACKGROUND OF THE INVENTION

Micro-lenses enhanced surfaces can be formed on a variety of surfaces and can be made using any number of materials and processes. A common form of micro-lens enhanced surface is the lenticular lens sheet. The lenticular lens sheet comprises a substrate or web with a top surface having a side-by-side array of substantially parallel refractive optical ridges and with a bottom surface that is generally flat.

In application, the lenticular lenses of the lenticular lens sheet typically receive light that passes from the direction of the flat surface toward the ridges and direct such light in a way that sends different portions of the light entering each lenticular lens to different portions of a viewing area in front of the lenticular lens. This light distribution function is commonly used to enhance viewing angles in rear projection television systems.

The light distribution function is also commonly used in conjunction with specially printed interlaced images to achieve various visual effects including motion effects and depth effects. See for example, commonly assigned U.S. Pat. No. 5,715,383 (Schindler et al.).

The interlaced images used with lenticular lenses typically comprise a substrate having parallel strips of recorded image information, the image bearing substrate being arranged to cooperate with the lenticular lenses, typically by affixing or otherwise positioning the image bearing substrate proximate to or against the flat surface of the lenticular lenses.

The parallel strips of recorded information represent image information from at least two different images. The interlaced image is typically then affixed to the flat surface so as to be viewed through the lenticular lens array. The image information used in forming the interlaced images is determined so that the lenticular lenses will direct light from different images toward different portions of a viewing space proximate to the viewing area so that a viewer viewing the image modulated light from a first portion of the viewing space will see different image information than a viewer viewing the resultant image from another portion of the viewing space.

While such images are popular with consumers it has proven difficult, in practice, to provide a high quality lenticular lens enhanced article. This is because it is typically quite difficult to fabricate lenticular lenses that have uniformly desirable optical properties.

In some cases, the difficulty in forming such lenticular lens enhanced articles arises because the manufacture of lenticular lens enhanced articles requires engraving a master relief pattern and then replicating lenticular lens sheets from the master. A number of conventional manufacturing methods have been developed to produce lenticular lens enhanced articles with the useful optical characteristics. These include machining, platen press, injection or compression molding, embossment, extrusion, and casting. The materials used to form the lenticular lenses for such articles include a variety of clear optical materials such as glass and many types of plastics. Each of these prior art methods suffers inherent problems which render them ineffective for the high-volume production of lenticular lens enhanced articles or other forms of micro-lens enhanced articles.

For example, machining can be used to directly manufacture coarse, one-of-a-kind large lenticular lens enhanced articles such as in thick plastic sheets. Milling machines or lathes can be used with a diamond tip tool having a predetermined radius. However, machining is a slow and costly process. This method for manufacturing lenticular enhanced surfaces is not well-suited to volume production.

In another example, a platen press can be used to stamp or emboss an engraved relief pattern into a thermoset material. The temperature of the thermoset material is raised to soften the material so that it conforms to the engraved surface. The temperature of the material is reduced to harden the material such that it retains the relief pattern when removed from the platen press. Like machining, this method is slow and expensive. Furthermore, the sheet size is limited. This method is not suited for high-volume production or for producing a continuous length product. Similar problems apply to injection or compression techniques for manufacturing molded lenticular lens enhanced articles.

In still another example of a method for manufacturing lenticular lens enhanced articles, extrusion embossment in continuous length roll form is used. Typically, these systems utilize an engraved roller with a thread-like screw pitch to the relief pattern. While such techniques enable relatively high-volume production, the quality and definition of extrusion relief patterns are generally inferior to patterns obtainable by platen or ultra-violet casting methods.

Extrusion techniques are also commonly used to help manufacture lenticular lens enhanced articles in relatively high-volumes. However, such techniques have difficulty maintaining the absolute parallelism of the lenticular rows. Due to the elastic nature of the molten plastic material and the internal stresses imparted by the embossing roller, the sheet has a tendency to change from its impressed shape prior to being fully set. Additionally, extrusion lenticular sheets can streak due to condensation, adding to the dimensional distortion and migration of the lenticular surface. These dimensional distortions create optical defects in the lenticular lenses that result in serious distortions and degradations in the perceived image. Migration is the tendency of the extruded plastic to move in a direction perpendicular to the direction of lenticulation during the extrusion process. Migration can also create dimensional distortion.

The optical quality of extruded lenticular lenses also suffers from the influences of the polymers from which they are formed. Some extrusion systems attempt to control this problem by curtain coating the polymers to a pre-extruded non-lenticulated web sheet requiring a binder coating to produce the multi-layered ply-sheet. Curtain coating is a process in which a flow of liquid plastic is set by a chill roller. This does not control the migration problem and adds defects such as bubbles, separation of surfaces, and diffusion of images, thus reducing the optical quality of the lenticular sheet.

Due to fabrication problems such as these, it has been common for many years to attempt to modify the process of generating and printing the interlaced image in various ways in order to conform the interlaced image to actual measured optical properties of the lenticular lenses.

However, even where this is done, difficulties arise in meeting the challenge of assembling the lenticular lens array sheets to the printed interlaced image in proper registration. Typically, these challenges are met by labor intensive operations.

Some of these assembly issues have been addressed by a photographic technique using a composite sheet having a back surface coated with a photosensitive emulsion. The stereoscopic images are obtained as multiple exposures of the photosensitive emulsion through a lenticular screen. The composite sheet has a layer of cured thermosetting polymer on one surface of a base polymer film. The patterned lenticular relief is imposed upon the thermoset layer by curing the thermosetting resin while it is wrapped around a molding surface. The technique requires that it be used only with continuous roll transparent films. The disadvantage of this approach is that only special dedicated equipment can produce overall full-width continuous roll transparent films having lenticular lenses on at least one surface. This of course is a complex and expensive operation that further requires a separate fixing step during which the exposed photosensitive material is converted into an image having a generally fixed appearance.

In still another alternative, the challenges of assembly are addressed by directly printing the interlaced image onto the flat surface of the lenticular sheet. This too is challenging and time consuming for conventional printing operations because of needs for greater precision, tight registration of the interlaced image to the lens, and correction for press induced distortion of the lens, requiring special printing techniques, custom equipment, and setup.

U.S. Pat. No. 5,330,799 (Sandor et al.) describes a method and apparatus for producing autostereograms using ultraviolet radiation-curable thermosetting polymers. A stereoscopic image is printed upon a plastic or paper sheet, which is fed directly onto a surface having an inverse lenticular pattern relief. As the sheet is fed onto the surface, a flow of ultraviolet-curable thermosetting polymer resin is directed at the surface. Ultraviolet radiation is directed at the polymer layer, curing the polymer and forming a lenticular array on the front surface of the polymer layer using a lenticular master consisting of inverse lenticular lenses. During this process, the sheet carrying the stereoscopic image is bonded to the back surface of the polymer lenticular layer in precise registration with the lenticular array. Only those parts of the printed image requiring micro-lenses are treated in this fashion. Since the printed image and the lenticular master are both pre-made, this invention still faces all the complications associated with alignment and registration.

In U.S. Pat. No. 5,460,679 (Abdel-Kader) describes a method for forming micro-lenses on a previously offset-printed image using screen-printing. An optic screen of finely spaced lines is formed as a cured emulsion on a mesh silk-screen. A clear gel is extruded through the mesh screen onto the front side of a clear plastic sheet, creating an array of lenses. An image is previously printed on the back side of the plastic sheet using an offset printer. An optic grid of lines is superimposed in the image. The optic grid has a relationship with the lenses to create special effects such as depth enhancement.

U.S. Pat. No. 6,546,872 (Huffer et al.) provides a method for making raised resin profile ridges using energy-curable inks and energy-curable coatings, for example, UV-curable inks and coatings, having differential surface tensions or different surface energies. The steps of the method include: (a) providing a transparent substrate sheet having a front and a back; (b) printing an array of substantially parallel lines in at least one energy-curable ink on the front of the sheet; (c) applying at least one energy-curable coating over the array printed in energy-curable ink, the ink and coating being chosen so that sufficient repulsion is created on contact between the ink and the coating to form an aligned series of contiguous beads of coating material before curing takes over to ensure the formation of a raised ridge structure over the image printed in energy-curable ink; and (d) curing to produce a stable pattern of raised resin profile ridges that follows the pattern of printed lines. Notably, the image and the lenticular lens arrangement are placed on opposite sides of the transparent substrate.

It will be appreciated that the approach of U.S. Pat. No. 6,546,872 creates difficulties when combined with conventional image printing in that a substrate is called upon to absorb both the inks or dyes used to form an image and the additional inks or dyes used to form the parallel lines of repulsive material. This can create difficulties where the printed image is printed using inks that inherently have some degree of repulsion, or where the inks or varnishes used to create the lines of repulsion interact with the inks used to form the image. Further there is a danger of oversaturating the substrate with inks or varnishes. Thus, the use of such techniques with particular images must be carefully considered and the results for any given interaction are not necessarily predictable.

It will also be appreciated that the aforementioned techniques generally assume that the lenticular sheet is co-extensive with the entire area of the image. However, the needs for printing applications are very different. For example, cost, weight, or other factors may cause a publisher to wish to avoid publishing entire pages of documents in lenticular form. Thus, for example, it may be useful to provide a three-dimensional or motion picture area as a part of a sheet or page of a book, it is much less desirable to do so where such an image will occupy an entire page.

Thus, there remains a need for a simple, flexible and efficient method to create useful lenticular lens arrays that are correctly registered to a printed image. There is a further need for greater variety in the form, distribution and arrangement of micro-lenses of other types that can be used with co-designed printed images to provide micro-lens enhanced articles that provide particular visual effects and that can be formed in a reliable fashion using generally available commercial resources.

SUMMARY OF THE INVENTION

Briefly, according to one aspect of the present invention a micro-lens enhanced element comprises a substrate having a first surface with a plurality of sequences of at least two image elements printed on the first surface, a transparent layer having a proximate surface confronting the printed image elements and a distal surface separated from the proximate surface, a plurality of lenticular lenses formed onto the distal surface with one lens formed over each sequence of at least two image elements, wherein mutually adjacent lenticular lenses are separated from one another by an ablatable low surface energy material. The lenticular lenses comprise a cured optically transparent fluid, which fluid can be a urethane acrylate oligomer. More particularly, the optically transparent fluid can be a urethane acrylate oligomer with a plurality of acrylate sequences per oligomer molecule. The low surface energy material can comprise a silicone compound, more particularly a polymethylsiloxane. The low surface energy material comprises an infrared dye which can be a near infrared dye that has substantially no absorption in the visible spectrum detectable by human eye. More particularly the infrared dye can be a dye prepared by condensation reactions with 4,5-dihydroxy-4-cyclopentene-1,2,3-trione.

The micro-lens enhanced element of the present invention is made by printing on a first surface of a suitable substrate a plurality of sequences of at least two image elements. A transparent layer is then provided over the image strips followed by a layer of low surface energy material over the transparent layer. The layer of low surface energy material is imagewise ablated to form a pattern of low surface energy strips on the transparent layer. The resulting low surface energy strips are between and proximate to consecutive sequences of image elements and separated by a sequence of image elements. A plurality of micro-lenses are then formed on the exposed areas of the transparent layer by the deposition of the optically transparent fluid, which naturally retracts from the low surface energy strips and balls up to develop a meniscus. The optically transparent fluid is then cured to create the micro-lenses.

BRIEF DESCRIPTION OF THE DRAWINGS

In the drawings which illustrate non-limiting embodiments of the invention.

DETAILED DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1A:
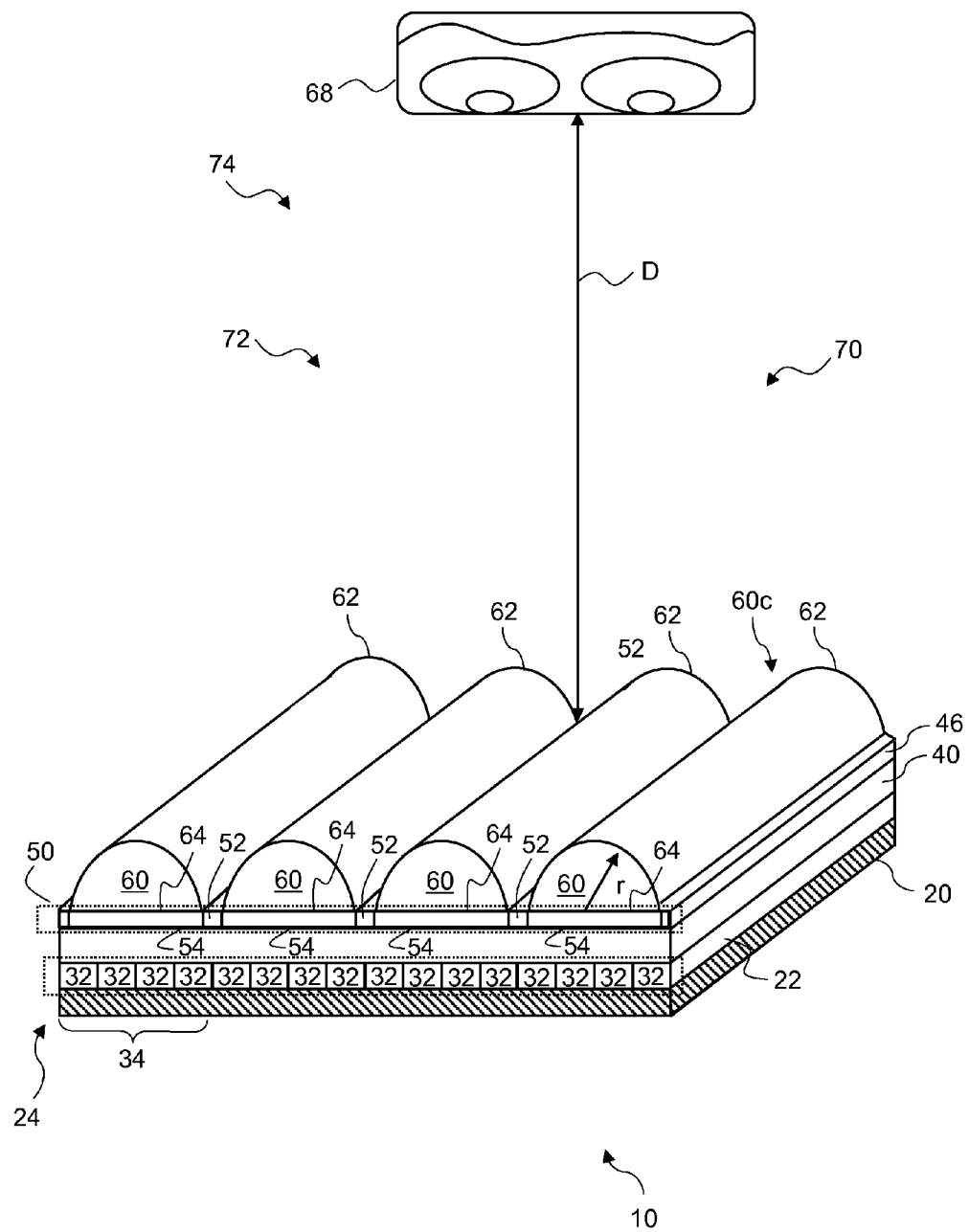
FIG. 1A shows a schematic perspective view of one embodiment of a micro-lens enhanced element.
Figure 1B:
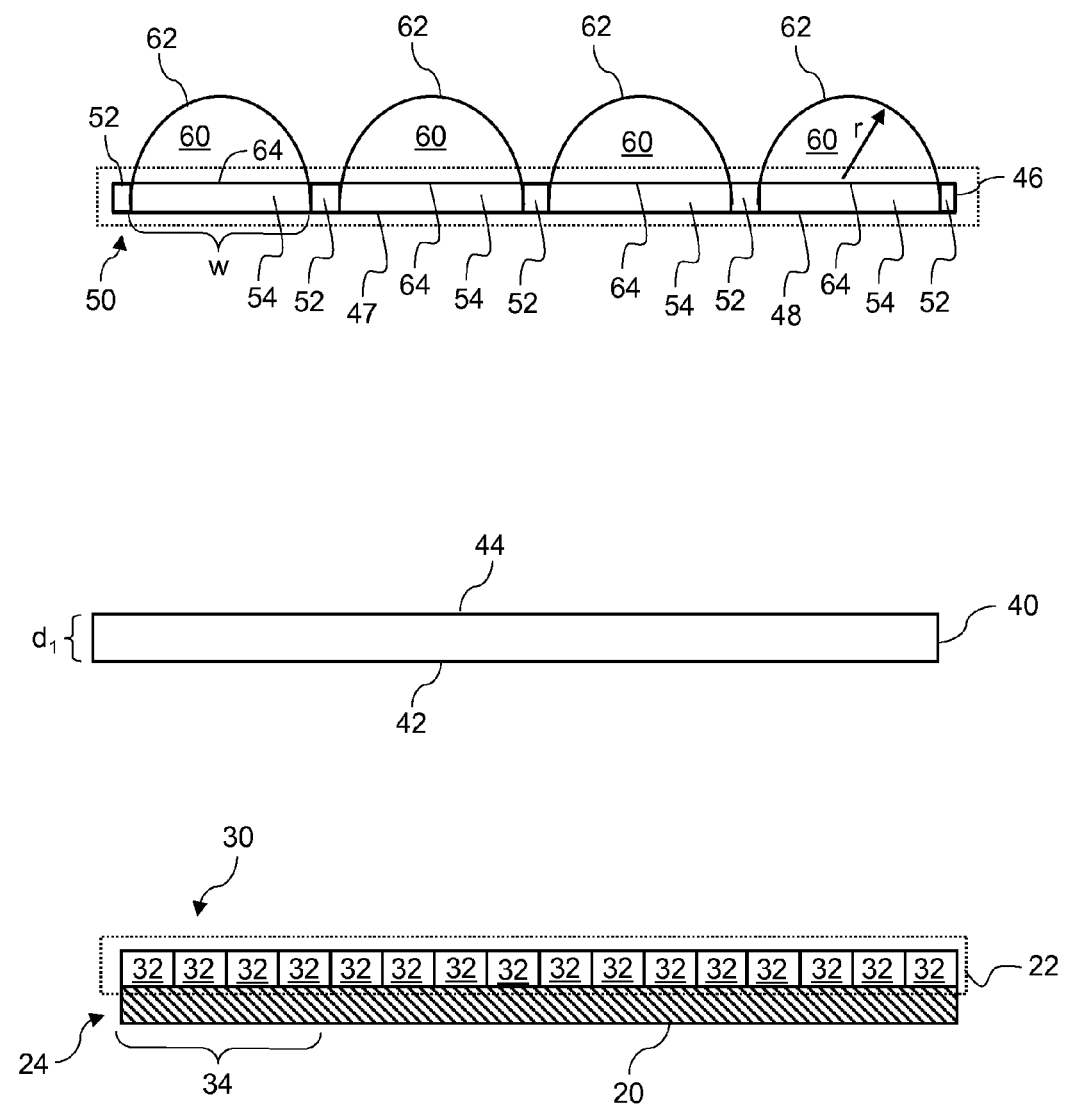
FIG. 1B shows an exploded cross-sectional view of the embodiment of FIG. 1A.

FIG. 1A shows a fractional length of one embodiment of a micro-lens enhanced element 10 while FIG. 1B shows an exploded cross-sectional view of the embodiment of FIG. 1A. In the embodiment of FIGS. 1A and 1B, micro-lens enhanced element 10 has a substrate 20 with a first surface 22 having an interlaced image 24 recorded on first surface 22.

Interlaced image 24 comprises a plurality of image elements 30 having image information from a first image interlaced with image elements 30 having image information from at least a second image. In FIGS. 1A and 1B, image elements 30 are shown in the form of interlaced image strips 32 that are formed on first surface 22. Interlaced image strips 32 are organized into sequences 34 of "n" image strips 32, with each sequence 34 having one image strip representing image information from a different set of the images that is incorporated into interlaced image 24. Similarly, where other forms of image elements 30 are used, such other image elements will typically also be organized into sequences of image elements 30 with each sequence of image elements 30 having one image element that is derived or determined based upon each of the images to be incorporated into an interlaced image. Methods for determining image information that is to be included in each individual image element 30 and for determining the arrangements of image elements 30 including the illustrated interlaced image strips 32 are known to those of skill the art.

An example micro-lens enhanced element 10 is provided in FIGS. 1A and 1B and, in this example, interlaced image 24 includes sequences 34 of four image strips 32 that incorporate image information from four different images. The number of image strips 32 that are associated in a sequence 34 of interlaced image strips 32 is hereinafter referred to as "n" purely for the sake of clarity. It will be appreciated that any "n" can be any integer greater than one.

As will be described elsewhere herein, it will be assumed that a micro-lens enhanced element 10 will form interlaced image 24 using image information from a plurality of "x" images by recording the "x" images using the "n" image strips. However, it will also be understood that there are a large number of factors that influence the design of a micro-lens enhanced element 10, and that in some embodiments, the number n of image strips 32 may differ from the number of images x to be presented using the number of image strips. For example, the number of image strips n can be greater than the number of images x and, in such embodiments, image information can be supplied to the additional image strips by interpolation from actual image information in adjacent image strips. Techniques for such interpolation are well known in the art. Similarly, under certain circumstances, the number of images x may exceed the number of image strips n in a sequence and in such instances image information from particular images can be combined, selectively omitted or otherwise integrated using techniques well known in the art to provide desired image effects using the available number of image strips n.

As is also shown in the embodiment of FIGS. 1A and 1B, a transparent layer 40 has a proximate surface 42 that is positioned confronting or against first surface 22 and that generally covers image strips 32. Transparent layer 40 also has a distal surface 44 that is separated from proximate surface 42 by a thickness d. Transparent layer 40 can be laminated to, coated on, formed on or otherwise provided so that proximate surface 42 is positioned against first surface 22 so that light that is modulated by image strips 32 passes directly into transparent layer 40 at first surface 22.

A pattern of low surface energy material 50 is provided on distal surface 44 of transparent layer 40. In the embodiment of FIGS. 1A and 1B, the pattern of low surface energy material 50 takes the form of a plurality of low surface energy strips 52 that are aligned in parallel with image strips 32 and are laterally separated by n image strips 32 resulting in a plurality of low surface energy strips 52. The progression of image strips 32 from left to right in FIGS. 1A and 1B is in repetitive order, and the sequence repeats in the exact same order after every n image strips 32. Typically, low surface energy strips 52 are made suitably narrow so that low surface energy strips 52 do not extend significantly over any given image strip 32 as compared with the total width of that image strip 32. In certain embodiments, adjacent sets of n image strips 32 can be separated by a small separation that allows the placement of low surface energy strips 52 in areas that do not necessarily block the travel of light that has been modulated by any of image strips 32, however this is not necessary.

Between each two spatially consecutive low surface energy strips 52 is a strip of substantially hemi-cylindrically shaped optically refractive material forming a lenticular type micro-lens 60 also referred to herein as a lenticular lens 60. As is noted above, the use of the term lenticular lens 60 in this and other examples is exemplary only, and is not limiting, as the techniques that are described herein can be used to make other forms of lenticular micro-lenses 60. Micro-lens enhanced element 10 comprises a plurality of images and image strips 32. Accordingly, this results in a plurality of lenticular lenses 60. As will be discussed in greater detail below, the shape of lenticular lenses 60 is defined by the interaction between a liquid micro-lens forming material comprising, for example, and without limitation, a curable high viscosity optically transparent printing fluid, transparent layer 40, a gaseous environment into which the liquid micro-lens forming material is injected and the low surface energy strips 52. In particular, the low surface energy strips 52 tend to resist the flow of such liquid micro-lens forming material across the low surface energy strips 52. This traps the liquid micro-lens forming material between low surface energy strips 52 and, as is known, such trapped liquid materials form a meniscus at a boundary between the low surface energy strips 52 and a gaseous environment, which can be as simple as air or which can take more complex forms of environment as desired.

Thus, lenticular lenses 60 formed in this fashion comprise a convex meniscus of the cured micro-lens forming material. This convex meniscus is aligned with the low surface energy strips 52 to provide a substantially cylindrically convex upper surface 62 with a radius of curvature or such other meniscus shaped surface as may be desired including, but not limited to, aspheric shape. Lenticular lenses 60 also have lower surfaces 64 that are coplanar with transparent layer 40 and joined thereto. Lower surfaces 64 have a lenticule base width w. Image strips 32 are on the same side of substrate 20 as lenticular lenses 60 and transparent layer 40, such that images recorded in the image strips can be viewed only when modified by lenticular lenses 60.

In the embodiment that is illustrated in FIGS. 1A and 1B, the x images on substrate 20 are interlaced as a sequence 34 of n image strips 32 with each sequence being arranged within a lenticular lens base width w. As is illustrated in this embodiment, each sequence of image strips includes four image strips 32 and represents image information taken from four images. Thus, here the number of image strips n is four and the number of images x is also four. The sequence of image strips 32 repeats exactly within each lenticular base width w. In the embodiment of FIGS. 1A and 1B, each of the n image strips 32 in a lenticular lens base width w is from a different one of the n images. Each repeating sequence 34 of x image strips 32 is positioned under a separate lenticular lens 60 so that image strips 32 from any given image within the plurality are always at the same position with respect to the lenticular lens 60 they are positioned under. For any given lenticular lens 60 having other lenticular lenses 60 as neighbors on two sides, and thereby not being at and parallel to an edge of micro-lens enhanced element 10, one image strip 32 from each of the plurality of interlaced images is located substantially underneath the given lenticular lens 60.

The thickness d of transparent layer 40 and the radius of curvature r of lenticular lenses 60 are chosen to ensure that a viewer 68 at a predetermined viewing distance D above the surface will experience a desired lenticular imaging effect. Typically, this effect is provided by arranging the lenticular lenses 60 so that they direct light that has been modulated by the imaging elements and that has passed through the thickness d of transparent layer 40 into one of plurality of different portions 70, 72, of a viewing area 74 such that light that has been modulated by different image elements is viewable in different portions of the viewing area. A wide variety of lenticular effects are known in the art including, but not limited to, depth image effects providing parallax differences, image morphing, image zooming, image animation, image flipping effects, or any other desired lenticular imaging effect. To the extent that lenticular lenses 60 may not be perfectly cylindrical, an additional offset distance h, (not shown) related to the geometric cross-sectional shape of lenticular lenses 60, can be allowed for in choosing one of r and h if the other of r and h is known together with viewing distance D and the refractive index of the micro-lens material when set. Additional offset distance h is a mathematical abstraction that is equivalent to a distance offset having units of distance, but does not represent a physical distance between two points that can be indicated on the drawing. The formulae and calculations for calculating h and for making such determinations and calculations are well known to practitioners in the field.

Figure 2:
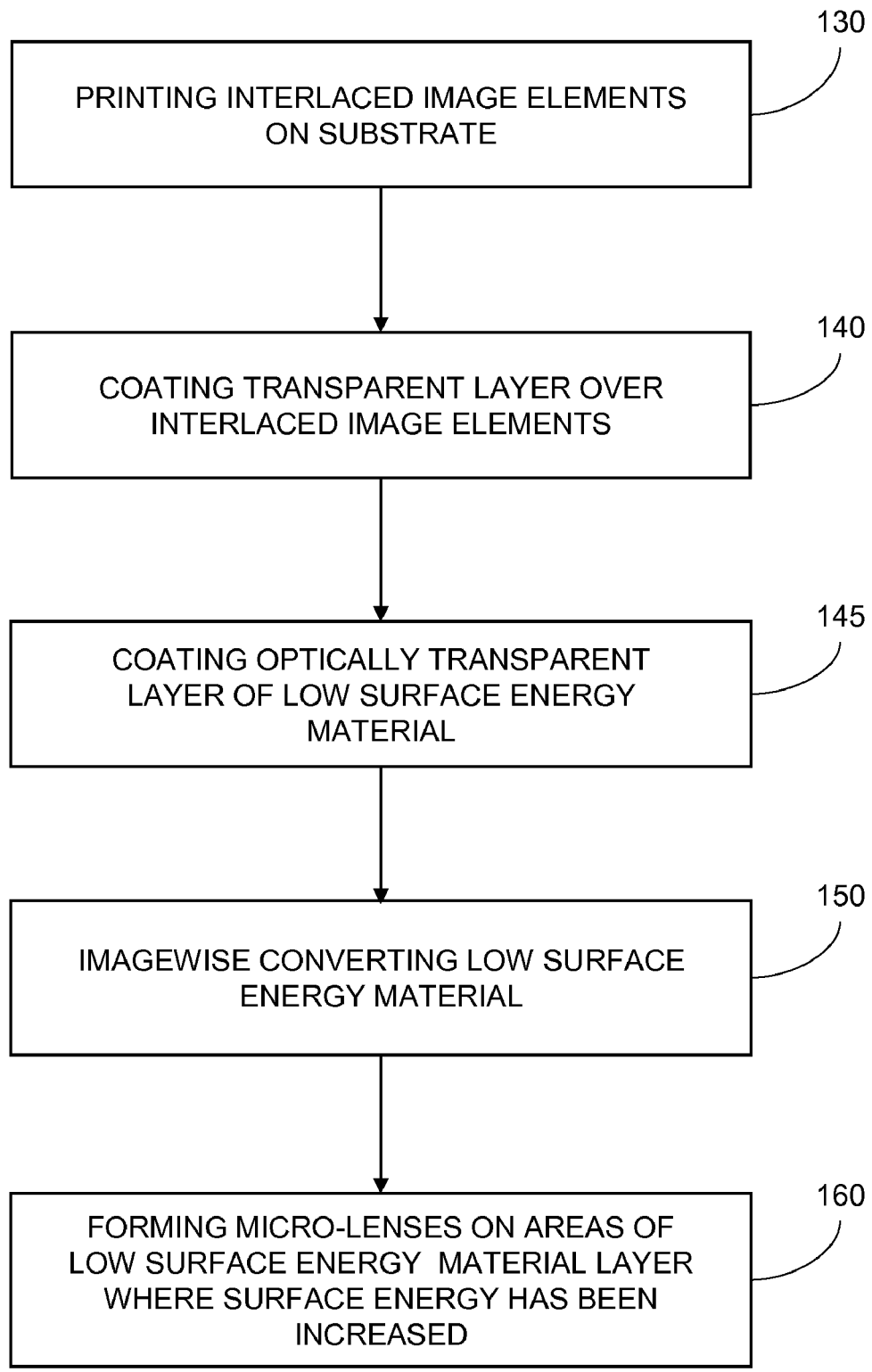
FIG. 2 is a flow diagram of one embodiment of a method for making a micro-lens enhanced article.

FIG. 2 illustrates one embodiment of a method for making a micro-lens enhanced element 10 of FIGS. 1A and 1B. As is illustrated in FIG. 2, the method comprises a first step which is the printing (step 130) of n image elements 30 on substrate 20 to form interlaced image 24. In the embodiment of FIGS. 1A and 1B, this is done with image strips 32 being interlaced as a sequence 34 of n image strips 32 per base width w of each lenticular lens 60 and with the sequence 34 of n image strips 32 repeating exactly within each lenticular base width w, each of the n image strips 32 in a lenticular base width w representing image information from a different one or more of a plurality of x images.

The process of printing (step 130) interlaced image elements 30 can comprise several steps, including, but not limited to, physical printing followed by anyone or more of the treatments of drying, heating and irradiating with actinic radiation to cure image strips 32, which actinic radiation can be any one or more of infrared, visible, UV or e-beam. The inks used for printing interlaced image strips 32 can be chosen according to the actinic radiation that is preferred, if any, and/or any other desired property of the finished interlaced image strips 32. The printing techniques can be any process that will give good adhesion to substrate 20 and can include any one of inkjet printing, wet or waterless offset lithographic printing, gravure printing, intaglio printing, electrophotographic printing and relief printing such as, but not limited to, flexographic printing, or the like.

Transparent layer 40 is then coated or otherwise fabricated over interlaced image 24 (step 140). Transparent layer 40 has a thickness d that is determined based upon a desired viewing distance D, a refractive index of the material of transparent layer 40 when set, the refractive index of the material of lenticular lenses 60 when set, the predicted geometric cross-sectional shape of lenticular lenses 60, and well understood principles of lenticular image formation. The process of coating can comprise several steps, including, but not limited to, physical coating followed by any one or more of the treatments of drying, heating and irradiating with actinic radiation to cure transparent layer 40 either partially or completely, which actinic radiation can be any one or more of infrared, visible, UV or e-beam. The material used for transparent layer 40 can be chosen according to the actinic radiation that is preferred and/or the refractive index that is preferred or any other desired property of the finished transparent layer 40. Suitable materials include those sold as overcoat varnishes for printing. Preferred materials are those coatings which, after application, can be cured or that can be more quickly cured when exposed to ultraviolet (UV) radiation or other forms of electro-magnetic or thermal energy. If necessary a small amount of filler such as silica may be dispersed in the liquid to improve the surface for the further processes as described below, as long as the refractive index and coating clarity are not adversely affected.

A pattern of low surface energy material 50 is then formed on the distal surface 44 of transparent layer 40 to coincide with desired locations for the edges of the lenticular lenses 60. In the embodiment of FIGS. 1A and 1B, this is achieved by a two step process. First a low surface energy material layer 46 is coated (step 145) onto distal surface 44 of transparent layer 40. This is followed by imagewise ablation (step 150) of the low surface energy material in the areas where low surface energy strips 52 are not required. The ablation is done so as to place low surface energy strips 52 parallel with the image strips and bracketing the ends of the repeating sequences 34 of n image strips 32 such that the first image strip 32 in any sequence 34 of n image strips 32 is always proximate and in the same relative position with respect to a low surface energy strip 52. The imagewise ablation (step 150) of layer 46 can be performed with an infrared laser ablation head, examples of suitable power being manufactured by Eastman Kodak Company. Since the infrared ablation head and the printer used for printing image strips 32 can both registered to substrate 20, it will be appreciated that low surface energy strips 52 can accurately be registered to the image strips 32. The pattern of low surface energy material 50 can therefore be formed in registration with a grouping of the image elements 30.

The process of coating (step 145) layer 46 can comprise several steps including, but not limited to, physical coating followed by any one or more of the treatments of drying, heating and irradiating with actinic radiation to cure low surface energy material 50, which actinic radiation can be any one or more of infrared, visible, UV or e-beam.

Low surface energy materials employed in pattern of low surface energy material 50 can take any of a variety of forms. In one non-limiting example, the low surface energy material includes a hydroxy-modified polyether silane. Any other known substantially transparent ablatable material having suitably low surface energy can also be used for pattern of low surface energy material 50. Low surface energy material for pattern of low surface energy material 50 can be chosen according to the actinic radiation, UV, infrared, e-beam or other, that is preferred and/or any other desired property of the finished low surface energy strips 52. Preferred low surface energy materials include, but are not limited to, silicone resin precursors and can be UV curable or can be solvent based. Preferred types of silicone pre-polymer solutions comprise a condensation system where the resulting polymeric layer is polydimethyl siloxane. One non-limiting example of a suitable coatable and ablatable low surface energy materials formulation is provided by U.S. Pat. No. 6,298,780 (Ben-Florin).

The polydimethyl siloxane based formulation of U.S. Pat. No. 6,298,780, however, employs Nigrosene dye as infrared absorber. Nigrosene is a black dye. For the present invention, the ablatable low surface energy layer 46 is ideally transparent in the visible range, and hence Nigrosene is replaced with an infrared absorbing dye that has little absorption in the visible range and adequate absorption in the infrared range of the laser ablation head 262 (see FIG. 5). Suitable dyes include, but are not limited to, near-infrared-absorbing dyes prepared by condensation reactions with 4,5-dihydroxy-4-cyclopentene-1,2,3-trione (croconic acid) described by Simard et al. in J. Org. Chem. 2000, 65, pp. 2236-2238, the oxygen-based variant with absorption peak at 845 nm being preferred. This dye has an absorption peak at 845 nm, which is close to the 830 nm emission peak of the typical diode lasers in a Kodak Trendsetter infrared laser head, and shows little absorption in the optical spectrum visible to the human eye. Squarylium dyes derived from the condensation of 2-methyl- and 4-methyl-chalcogenopyrylium salts with 3,4-dihydroxy-3-cyclobutene-1,2-dione (squaric acid), as described in the same work by Simard et al., are also useful for the same reasons, the dye of this form based on selenium and having peak absorption at 847 nm being particularly well suited to the task. Combinations of dyes in these croconic and squaric acid based families can be used to increase absorption at the emission wavelength of the laser diodes of the laser ablation head. Cyanine dyes exist that are better matched to the 830 nm emission wavelength and can be used, provided the slight visible range absorption of these dyes are tolerable or manageable to the user.

Lenticular micro-lenses 60 are formed on those parts of the surface of transparent layer 40 from which optically transparent layer of low surface energy material 46 has been ablated (step 160). The forming of lenticular lenses 60 can comprise several combinations of different steps which will now be outlined.

Figure 3:
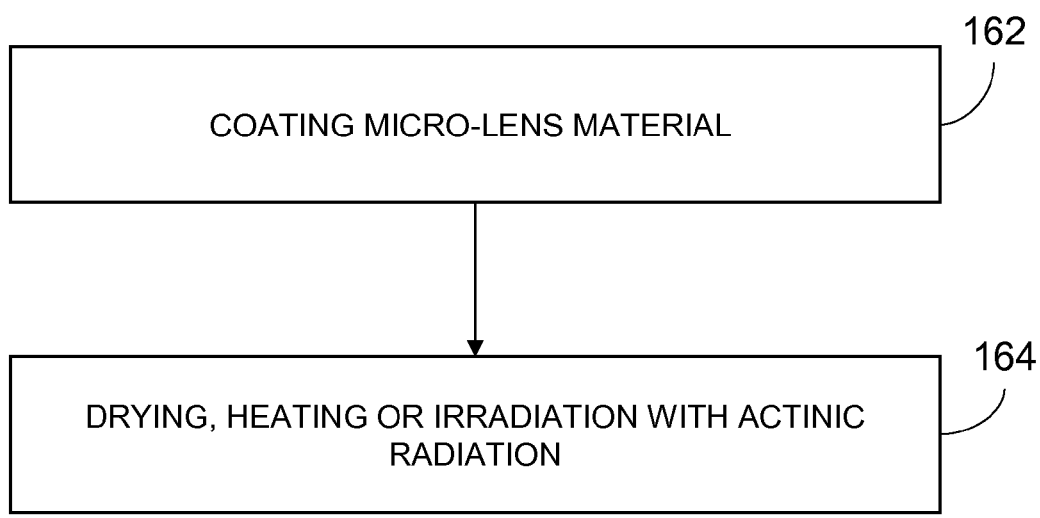
FIG. 3 is a flow diagram for one embodiment of a method of forming a micro-lens enhanced article.

One embodiment of this is shown in FIG. 3, wherein the forming (step 160) of micro-lenses 60 comprises the step of coating (step 162) micro-lens material over the distal surface 44 and pattern of low surface energy material resulting from the ablation (step 150) of transparent layer 46 on distal surface 44 of transparent layer 40. The micro-lens material does not bond with the material of low surface energy strips 52 and retracts from strips 52 to reside exclusively on the exposed areas of distal surface 44 of transparent layer 40, where adhesion to transparent layer 40 causes the micro-lens material so residing to develop a curved surface that is determined by the convex meniscus of the uncured micro-lens material. In this way, lenticular lenses 60 are formed in a pattern that is defined by the pattern of low surface energy material 50. This may be followed by any one or more of the treatments (step 164) of drying, heating and irradiating with actinic radiation to cure the material of the lenticular lenses, which actinic radiation can be any one or more of infrared, visible, UV or e-beam. The micro-lens material can be chosen according to the actinic radiation that is preferred and/or the refractive index that is preferred or any other desired property of the finished lenticular lenses 60. The preferred materials will be 100% solids, generally optically transparent and preferably solidified after application of suitable actinic radiation.

Micro-lens material can take any of a variety of forms. In one embodiment, the micro-lens material can be an optically transparent UV curable printing fluid comprising an ultraviolet curable polymerizable material and a photo initiator. In this embodiment, the polymerizable material comprises a monomer and an oligomer. The monomer is chosen from the sequence including, but not limited to, octyl/decyl acrylate, phenoxyethyl acrylate, isobornyl acrylate and triethylene glycol diacrylate. For example, and without limitation, the oligomer of this embodiment can be an acrylic oligomer such as a urethane oligomer with a plurality of acrylate sequences per oligomer molecule. In some embodiments, the acrylic oligomer can have two to four acrylate sequences per oligomer molecule. Examples of suitable commercial urethane oligomers with two to four acrylate sequences per oligomer molecule include, but are not limited to, Ebecryl EB270, Ebecryl EB 230 and Ebecryl EB210 (all from Daicel-UCB of Tokyo, Japan), as well as Craynor CN970, Craynor CN971, and Craynor CN972 (all from Sartomer of Exton, Pa., U.S.A.). The photoinitiator is preferably selected from among the sequence consisting of isopropylthioxanthone, 4-benzoyl-4'-methyl diphenyl sulphide, 1-Hydroxy-cyclohexyl-phenyl-ketone, 2-Methyl-1-(4-(methylthio)phenyl)-2-morpholinopropanone-1,1-(4-Dodecylphenyl)-2-hydroxy-2-methyl-propane-1-one and dibutoxyacetophenone hydroxymethyl phenylpropane-1-one. No initiator is required for the case of materials to be irradiated with e-beam. The viscosity of the material can be adjusted to suit the particular printing method and to obtain a desired meniscus radius of curvature of the coated materials.

Figure 4A:
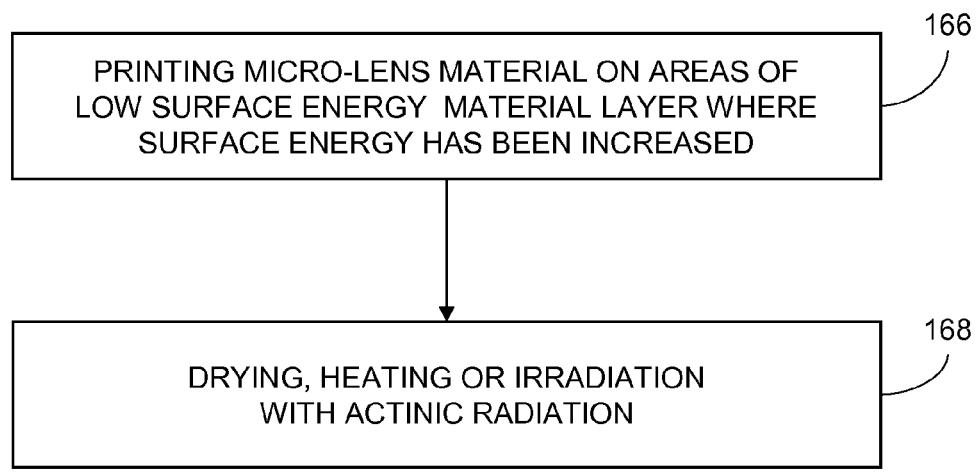
FIG. 4A is a flow diagram for another method of forming a micro-lens enhanced article.

In a further embodiment of the present invention, shown in FIG. 4A, the forming of micro-lenses (step 160) comprises the steps of printing (step 166) micro-lens material only on those parts of transparent layer 40 where low surface energy strips 52 are not present. Due to the low surface energy of low surface energy strips 52, the micro-lens material does not bond with low surface energy strips 52 and any micro-lens material in contact with low surface energy strips 52 retracts from low surface energy strips 52 to reside exclusively on the exposed areas of the surface of transparent layer 40, where adhesion to transparent layer 40 causes the micro-lens material so residing to develop a curved surface that is determined by the convex meniscus of the uncured micro-lens material.

As is illustrated, step 166 can be followed by one or more of any of the treatments of drying, heating and irradiating with actinic radiation to cure the materials of lenticular lenses 60, which actinic radiation can be any one or more of infrared, visible, UV or e-beam (step 168). The uncured micro-lens material can be chosen according to the actinic radiation that is preferred and/or the refractive index that is preferred or any other desired property of the finished lenticular lenses 60.

The uncured micro-lens material can be an optically transparent UV curable printing fluid including, but not limited to, a curable inkjet material and can comprise an ultra-violet curable polymerizable material and a photoinitiator; wherein the viscosity of the composition is between 2 poise and 30 centipoise. Preferably the polymerizable material comprises a monomer and an oligomer. The monomer can be chosen from the sequence including, but not limited to octyl/decyl acrylate, phenoxyethyl acrylate, isobornyl acrylate and triethylene glycol diacrylate. Preferably the oligomer is an acrylic oligomer. The oligomer can also be a urethane oligomer with a plurality of acrylate sequences per oligomer molecule. The acrylic oligomer can have, for example, two to four acrylate sequences per oligomer molecule. Examples of suitable commercial urethane oligomers with two to four acrylate sequences per oligomer molecule include, but are not limited to, Ebecryl EB270, Ebecryl EB 230 and Ebecryl EB210 (all from Daicel-UCB of Tokyo, Japan), as well as Craynor CN970, Craynor CN971, and Craynor CN972 (all from Sartomer of Exton, Pa., U.S.A.). The photoinitiator is preferably selected from among the sequence consisting of isopropylthioxanthone, 4-benzoyl-4'-methyl diphenyl sulphide, 1-Hydroxy-cyclohexyl-phenyl-ketone, 2-Methyl-1-(4-(methylthio)phenyl)-2-morpholinopropanone-1,1-(4-Dodecylphenyl)-2-hydroxy-2-methyl-propane-1-one and dibutoxyacetophenone hydroxymethyl phenylpropane-1-one. No initiator is required for the case of materials to be irradiated with e-beam. The viscosity of the material can be adjusted to suit the particular coating method and to obtain a desired meniscus radius of curvature of the coated materials.

The technologies for applying a micro-lens material to distal surface 44 and the pattern of low surface energy material 50 are not limited to coating or printing technologies, and can include any of technologies that are capable of depositing requisite amounts of material with very good accuracy and can include, but are not limited to, inkjet printing and air brushing.

Figure 4B:
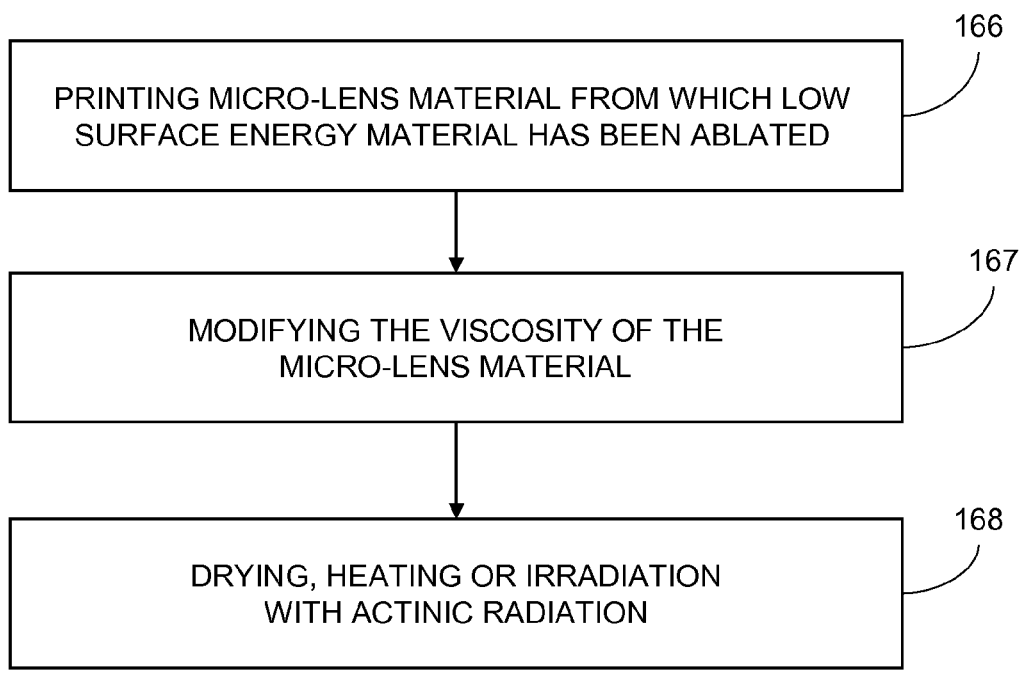
FIG. 4B is a flow diagram for another method of forming a micro-lens enhanced article.

In a further embodiment, shown in FIG. 4B, the steps 166 and 168 are performed as discussed above with reference to FIG. 4A. Further, as is shown in FIG. 4B, an additional step of modifying the viscosity of the micro-lens material (step 167) is performed before printing (step 166) the micro-lens material onto transparent layer 40. This modification can be done such that an easily printable viscosity form of micro-lens material can be used during printing, and converted into a different viscosity material for use in forming lenticular micro-lenses 60. This can be done by at least one of partially drying and heating and irradiating (step 167) with actinic radiation the micro-lens material on a suitable transfer surface. Examples of a suitable transfer surface include, but are not limited to, an offset blanket roller, the kind of transfer surface described in commonly-assigned U.S. Application Publication No. 2008/0302262 (Pinto et al.), as well as the transfer surface arrangements described in U.S. Pat. No. 6,409,331 (Gelbart), and U.S. Pat. No. 6,755,519 (Gelbart et al.), both of which, commonly-assigned patents, describe inkjet-based systems for modifying inks on transfer surfaces using variously heating, drying and ultra-violet irradiation of inks to change their viscosity, each of which is incorporated by reference herein.

Figure 5:
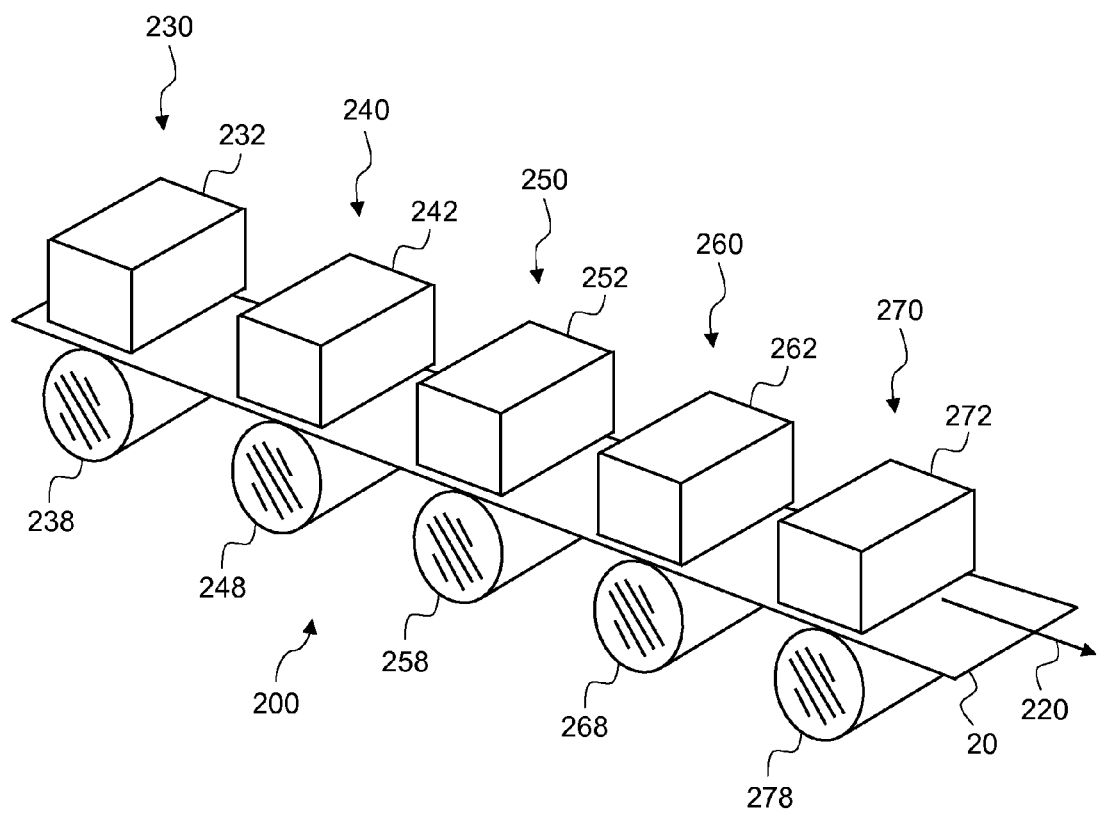
FIG. 5 shows one embodiment of an apparatus for making a micro-lens enhanced article.

FIG. 5 shows one example of a micro-lens enhanced printing system 200 that is capable of making a micro-lens enhanced element using at least one of the embodiments of the method described above. In the apparatus shown in FIG. 5, a micro-lens enhanced system 200 comprises an interlaced image printing subsystem 230, a transparent layer coating subsystem 240, a low surface energy material coating subsystem 250, an ablation subsystem 260 and micro-lens material application subsystem 270, all arranged in series to create a micro-lens enhanced element 10 of the type shown in FIGS. 1A and 1B by deposition of fluids via printing or coating suitable images and layers onto substrate 20 moving in direction 220. Each of subsystems 230, 240, 250, and 270 respectively comprises, in this embodiment, a printing or coating unit, schematically represented as a "black box" 232, 242, 252, and 272 respectively, and a compression roller 238, 248, 258, and 278. Ablation subsystem 260 comprises laser ablation head, shown as a "black box" 262 and compression roller 268. Substrate 20 is illustrated as being moved over compression rollers 238, 248, 258, 268, and 278 in direction 220. However, other forms of conveyance known to those of skill in the art can be used. Each of the subsystems 230, 240, 250, 260, and 270 will now be described in greater detail in turn.

Interlaced image printing subsystem 230 can be any commercial printing system including, but not limited to, an inkjet printing system, a wet or waterless offset lithographic printing system, a gravure printing system, an intaglio printing system, a electrophotographic printing system or a relief printing system such as, but not limited to, a flexographic printing system, or the like. The requirement on interlaced image printing subsystem 230 is that it be able to print n interlaced images, in registration with any pattern of low surface energy material 50 formed by ablation subsystem 260 and micro-lens material application subsystem 270.

This is best done by registering the printhead of image printing subsystem 230 to substrate 20. This may be done using fiduciary marks (not shown) on substrate 20. A variety of registration systems have been described in the art and one of ordinary skill in the art will be capable of selecting one of such registration systems and of applying it to the purposes that are described herein.

Transparent layer coating subsystem 240 can be any coating system capable of coating a layer of liquid material to a thickness that forms a transparent layer 40 having a thickness d after printing. Thickness d is derived from a desired viewing distance, the refractive index of the material of transparent layer 40 when set, the refractive index of the material of lenticular lens 60 when set, the predicted geometric cross-sectional shape of lenticular lens 60, and well known principles of lenticular image optics. Several such systems are in existence and have been described in the art. Suitable coating subsystems include, but are not limited to, those described in U.S. Pat. No. 5,908,505 (Bargenquest et al.). To the extent that larger lenticular lenses require larger thicknesses for transparent layer 40 of micro-lens enhanced element 10, a transparent layer coating subsystem 240 of the type described in U.S. Pat. No. 5,908,505 is capable of producing thicker layers of materials than those usually produced on presses and coating machines.

Low surface energy material coating subsystem 250 can be any coating system capable of coating a layer of liquid material to a thickness suitable for forming the pattern of low surface energy material 50. Several such systems are in existence and have been described in the art.

Laser ablation head 262 of ablation subsystem 260 can be any commercial laser ablation head such as, but not limited to, those manufactured by Eastman Kodak Company of Rochester, N.Y., U.S.A. and formerly by CREO of Vancouver, British Columbia, Canada. In this embodiment, a requirement of laser ablation head 252 is that it be able to ablate low surface energy material layer 46 to form pattern of low surface energy material 50 in registration with any printing done by interlaced image printing subsystem 230 and micro-lens material application subsystem 270. This is best done by registering the laser ablation head 262 to substrate 20. This may be done using fiduciary marks (not shown) on substrate 20 or by detecting features of printing performed during previous printing steps, or by detecting features of substrate 20. As noted above, a variety of registration systems have been described in the art and one of ordinary skill in the art will be capable of selecting one of such registration systems and of applying it to the purposes that are described herein.

Micro-lens material application subsystem 270 can be any commercial printing or other fluidic material delivery system capable of imagewise transferring a large enough volume of micro-lens material as required for the formation of a desired micro-lens such as lenticular lenses 60 in FIGS. 1A and 1B. Micro-lens material application subsystem 270 can include, but is not limited to, an inkjet printing system and an air brushing system or the like. Where lenticular lenses 60 are continuous structures in one dimension across transparent layer 40, inkjetting can be performed at a high deposition rate in that direction. One desirable feature of micro-lens material application subsystem 270 is that it be able to apply lenticular lens material in registration with any ablation done by laser ablation head 262 and interlaced image printing subsystem 230. This is best done by registering the printhead of micro-lens material application subsystem 260 to substrate 20. This may be done using fiduciary marks (not shown) on substrate 20. A variety of registration systems have been described in the art and one of ordinary skill in the art will be capable of selecting one of such registration systems and of applying it to the purposes that are described herein.

Any one or more of subsystems 230, 240, 250, and 270 can further comprise a drying, heating and or irradiation subsystem (not separately shown in FIG. 5). Such a drying, heating or irradiation subsystem can be used to assure suitable throughput of micro-lens enhanced system 200 as a whole. The printed and coated images and structures produced by subsystems 230, 240, 250, and 270 can be post-deposition treated by drying, heating and or irradiation with the drying, heating and or irradiation subsystems respectively, before proceeding to a following subsystem or further process beyond micro-lens enhanced system 200. Suitable drying, heating and irradiation systems have been described in the art and will not be further dwelt upon here.

Micro-lens material application subsystem 270 can additionally comprise a transfer surface drying, heating or irradiation subsystem for partially drying or for heating or irradiating the micro-lens material while it resides on a transfer surface and before being applied to substrate 20, thereby changing the viscosity of the micro-lens material. This provides an additional mechanism to manage the cross-sectional shape of the lenticular lenses. In the present specification the term "micro-lens material modification system" is used to describe such a transfer surface drying, heating or irradiation subsystem.

One particular system employing such a transfer surface is that described in U.S. Application Publication No. 2008/0302262, which describes a transfer surface of a direct printing device comprising a plurality of cavities. Each cavity is designed to store sufficient liquid, to print on a specified area of a substrate. The liquid is loaded on the printing surface by, for example, an anilox roller. After being loaded, the liquid is imagewise modified to change the liquid affinity to transparent layer 40 or to the transfer surface. After the modification two forms of liquid, being micro-lens material in the present case, will coexist on the transfer surface; a material that will remain on the transfer surface after imaging, and a material that will transfer from the printing surface onto transparent layer 40. Other suitable transfer surface arrangements are described in commonly-assigned U.S. Pat. No. 6,409,331 (Gelbart), and U.S. Pat. No. 6,755,519 (Gelbart et al.), both of which describe inkjet-based systems for modifying inks on transfer surfaces using variously heating, drying and ultraviolet irradiation of inks to change their viscosity. Micro-lens material application subsystem 270 can be an ink-jet printing system comprising the transfer surface arrangements of either of these two patents.

Figure 6:
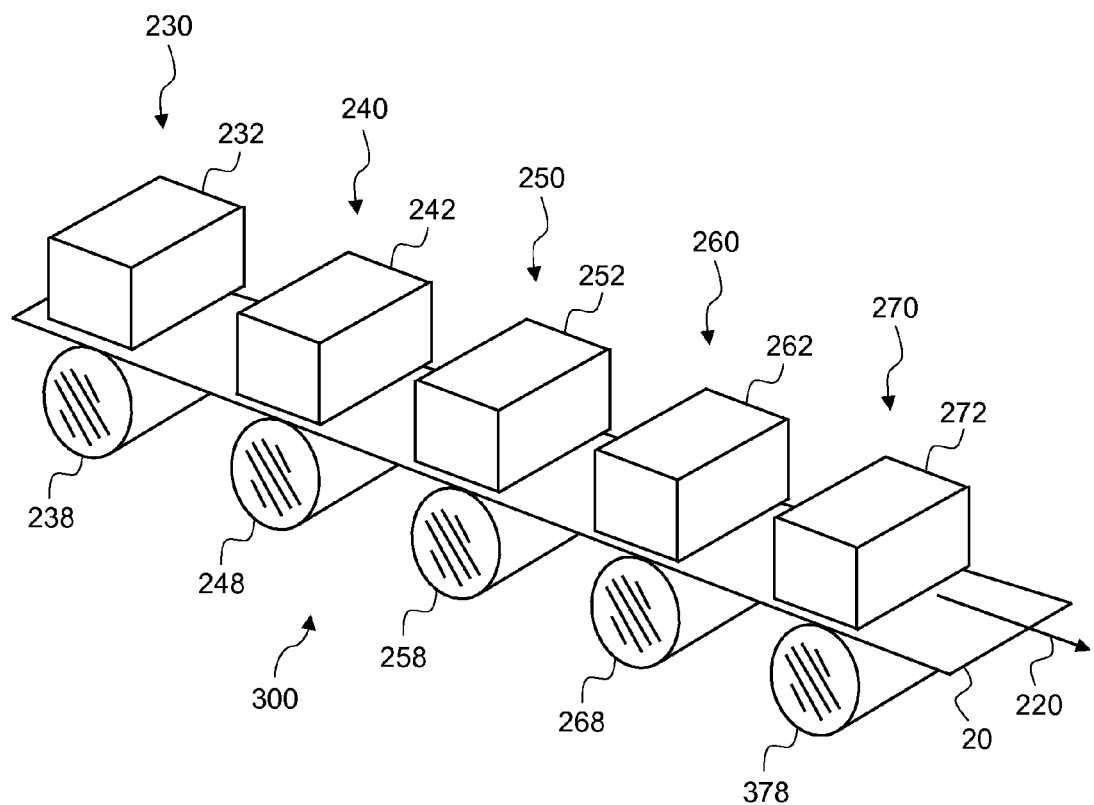
FIG. 6 shows another embodiment of an apparatus for making a micro-lens enhanced article.

FIG. 6 shows another embodiment of an apparatus for making a micro-lens enhanced element using at least one of the methods described herein.

The apparatus comprises a micro-lens material coating subsystem 370 for the forming of lenticular lenses (step 160) that is adapted to coat a layer of (162) micro-lens material over an entire portion of distal surface 44 resulting from the ablation (step 150) of low surface material layer 46 on the surface of transparent layer 40. In FIG. 6, lenticular element printing system 300 comprises an interlaced image printing subsystem 230 as described before, a transparent layer coating subsystem 240 as described before, low surface energy material coating subsystem 250 as described before, ablation subsystem 260 as described before, and a micro-lens material coating subsystem 370, all arranged in series to create a micro-lens enhanced element of the type shown in FIGS. 1A and 1B by deposition of fluids via printing or coating suitable images and layers onto substrate 20 moving in direction 220. Each of subsystems 230, 240, 250 and 370 is respectively comprised of a printing or coating unit, schematically represented as a black box 232, 242, 252, and 372 respectively, and a compression roller 238, 248, 258 and 378. Ablation system 260 comprises laser ablation head, shown as a "black box" 262 and compression roller 268. As above, substrate 20 moves over compression rollers 238, 248, 258, 268, and 378 in direction 220.

Micro-lens material coating subsystem 370 can be any coating system capable of coating a layer of liquid micro-lens material sufficient to form a desired thickness of micro-lens material. Several such systems are in existence and have been described in the art. Suitable coating subsystems include, but are not limited to, those described in U.S. Pat. No. 5,908,505 (Bargenquest et al.). To the extent that larger lenticular lenses require larger amounts of material to be transferred, micro-lens coating subsystem 370 can be of the type described in U.S. Pat. No. 5,908,505. The degree to which the printing method employed in micro-lens material coating subsystem 370 can transfer micro-lens material and can control that transfer is important, as it determines the quality of the lens. The choice of technology and choice of micro-lens material is therefore important.

Any one or more of subsystems 230, 240, 250, and 370 can further comprise a drying, heating and or irradiation subsystem (not shown). In order to assure suitable throughput of lenticular element printing system 300 as a whole, the printed and coated images and structures produced by subsystems 230, 240, 250 and 370 can be post-deposition treated by drying, heating and or irradiation with the drying, heating and or irradiation subsystems respectively, before proceeding to a following subsystem or further process beyond lenticular element printing system 300. Suitable drying, heating and irradiation systems have been described in the art and will not be further dwelt upon here.

In the foregoing discussion, lenticular micro-lenses 60 have been generally described as being cylindrical portion micro-lenses that have the shape and cross-section of a portion of a cylinder. However, it will be appreciated that various configurations of lenticular micro-lenses 60 can be used including but not limited to, a micro-lens enhanced element 10 having an a cylindrical portion lenticular element with a shape and cross-section of a flattened or elongated cylinder, or having such other aspheric shapes as are known in the lens making arts.

Figure 7A:
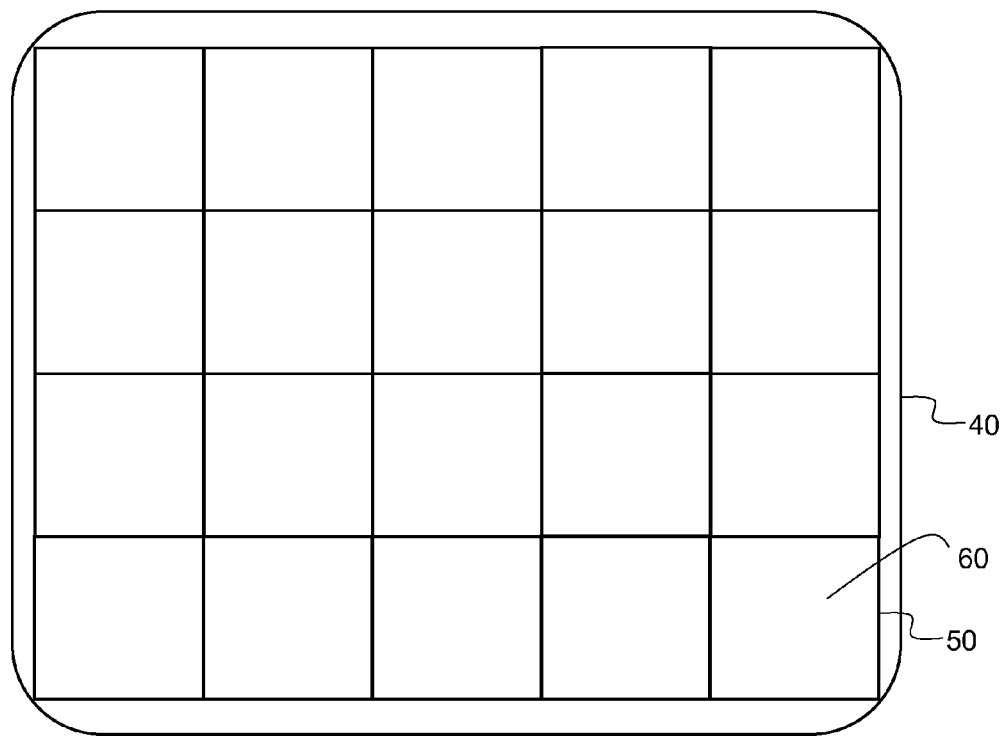
FIG. 7A shows, conceptually, one embodiment of a pattern of lenticular lenses in a uniform cubic close packed distribution.
Figure 7B:
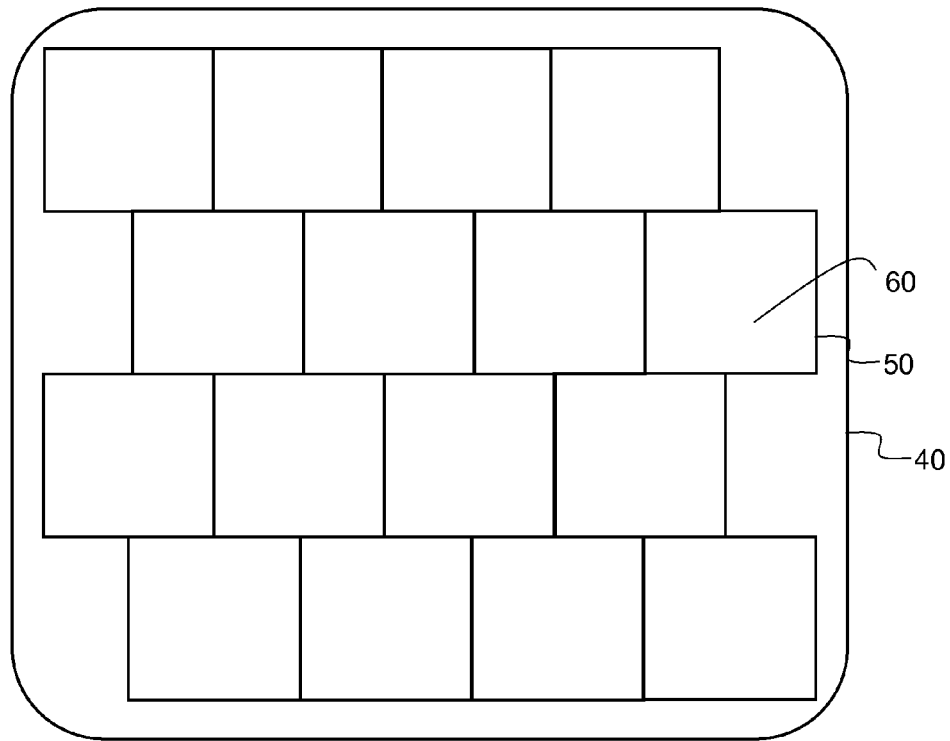
FIG. 7B shows, conceptually, one embodiment of a pattern of lenticular lenses in an off-set square close packed array pattern.
Figure 7C:
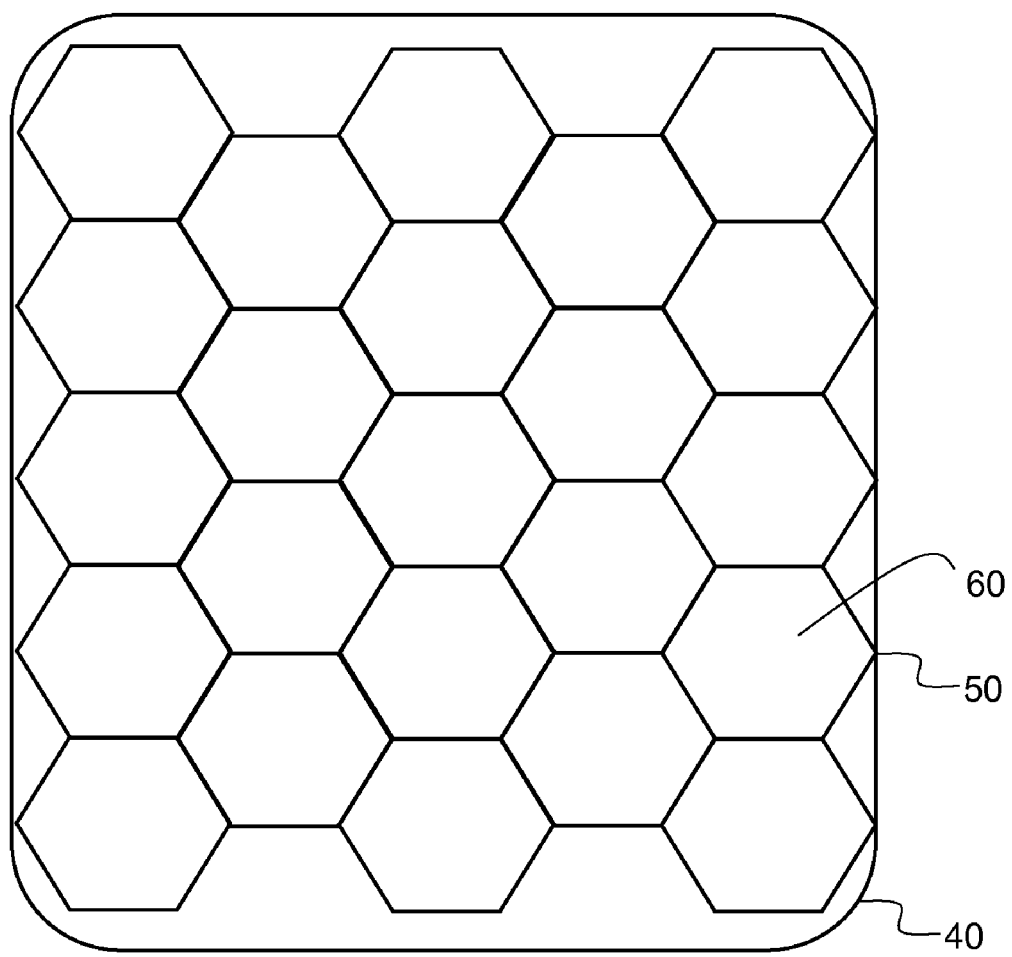
FIG. 7C shows, conceptually, a pattern of lenticular lenses in a hexagonal close packed pattern.

As is noted generally above, in other embodiments, the techniques that are described above can be used, for example, to provide a micro-lens enhanced element 10 having a pattern of low surface energy material 50 that causes the lenticular material to form micro-lenses other than lenticular lens type micro-lenses. For example, FIG. 7A shows conceptually, a pattern of lenticular lenses 60 that are formed within a uniform cubic close packed distribution pattern of low surface energy material 50 on a distal surface 44. It will be appreciated that other patterns of low surface energy material 50 can be used. For example, FIG. 7B shows an embodiment having an off-set square close packed array pattern. However, in another embodiment shown in FIG. 7C, lenticular micro-lenses 60 are arranged in a hexagonal close packed pattern of low surface energy material 50.

Figure 8A:
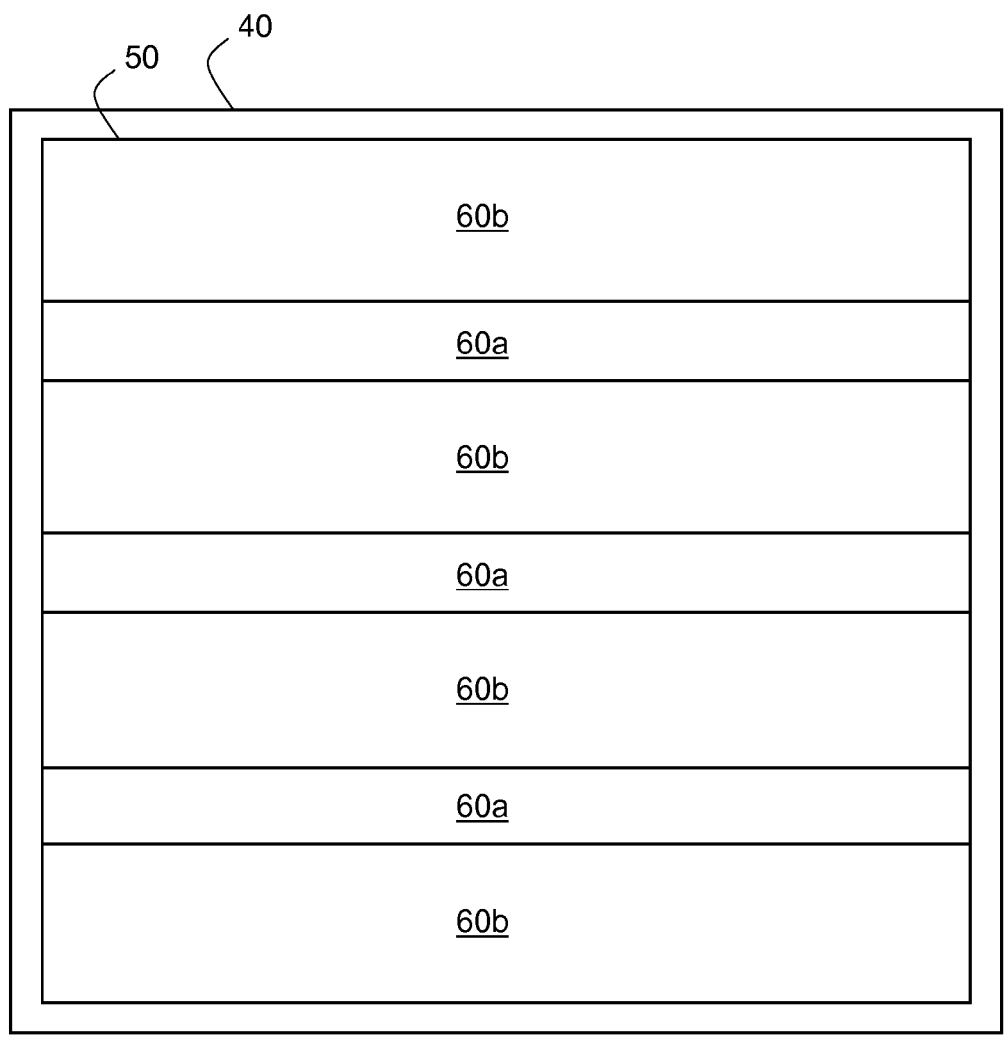
FIGS. 8A-8C show different embodiments of different types of micro-lenses.
Figure 8B:
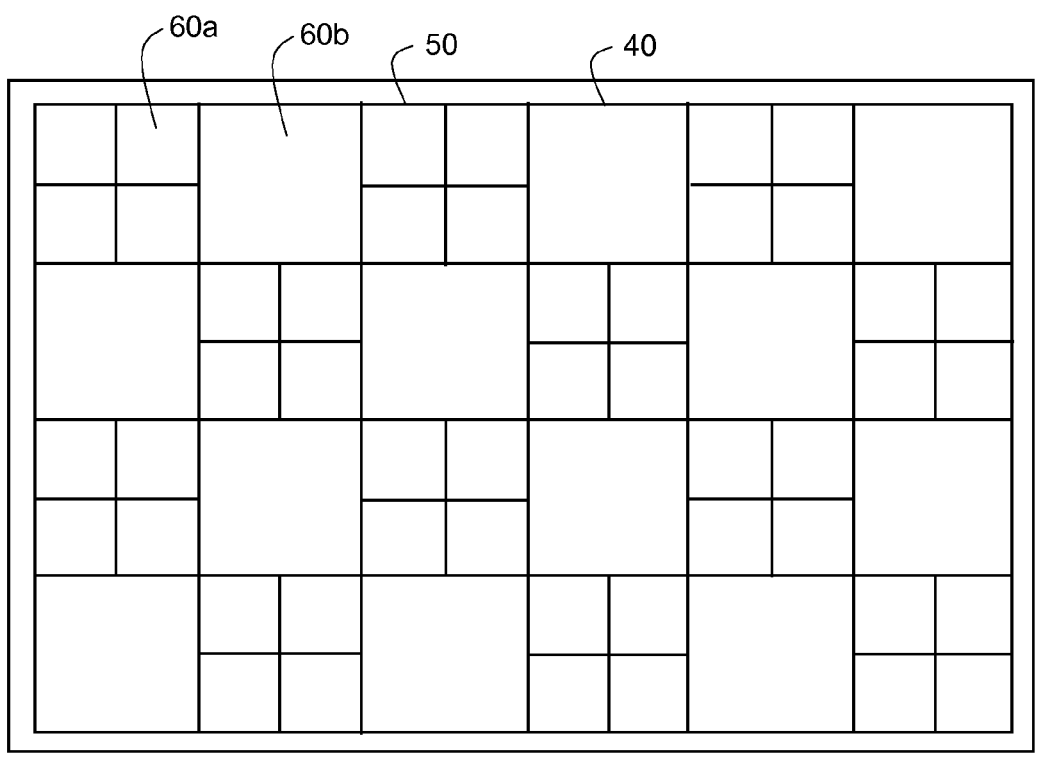
Figure 8C:
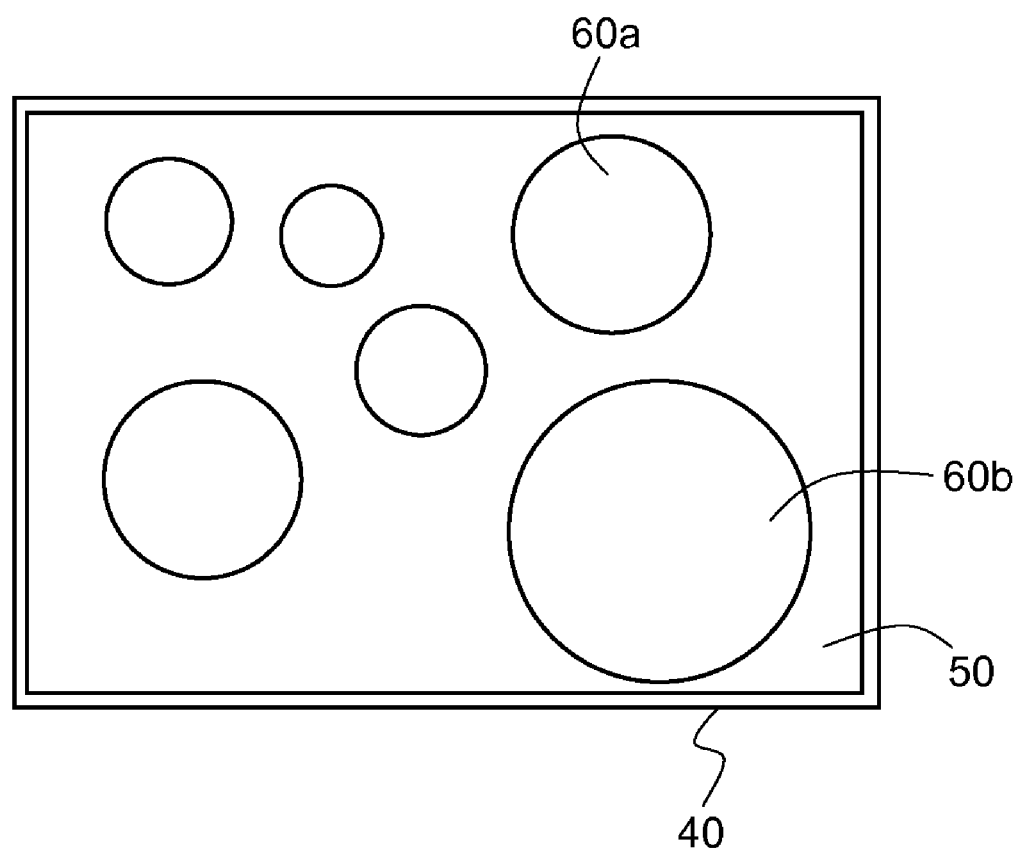

As is shown in FIGS. 8A, 8B, and 8C lenticular micro-lenses 60 can be made with individual ones of the lenses having different optical characteristics. In the embodiment of FIG. 8A, lenticular type cylindrical micro-lenses 60*a* and 60*b* are formed having different widths. As is shown in FIG. 8A, pattern of low surface energy material 50 defines parallel lines that have separations that are different, thus forming a first set of lenticular micro-lenses 60*a* that have a greater cross-section area than a second set of lenticular micro-lenses 60*b*. This can be done for example and without limitation to incorporate more image strips 32 per lenticular lens 60*a* than are incorporated in association with lenticular lenses 60*b*. This can be used, for example, to provide more information or different information for presentation or to provide a different viewing distance for the image information.

Similarly, FIGS. 8B and 8C each show a pattern of low surface energy material 50 that is used to form differently sized sets of micro-lenses 60*a* and 60*b*.

As is also shown in FIG. 8C, the surface coverage of lenticular micro-lenses 60*a* and 60*b* does not have to be maximized. While any useful surface coverage of micro-lenses 60*a* and 60*b* can be employed, the ratio of the area of the micro-lenses 60*a* and 60*b* to the area of distal surface 44, can be at least 20 percent. In one embodiment, the coverage can be between at least 50 percent and up to 85 percent. In another embodiment, surface coverage of 85 percent up to the close-packed limit can be used. The precise degree of surface coverage can be adjusted to enable varying levels of micro-lens coverage as is necessary to support the disclosure.

Figure 9A:
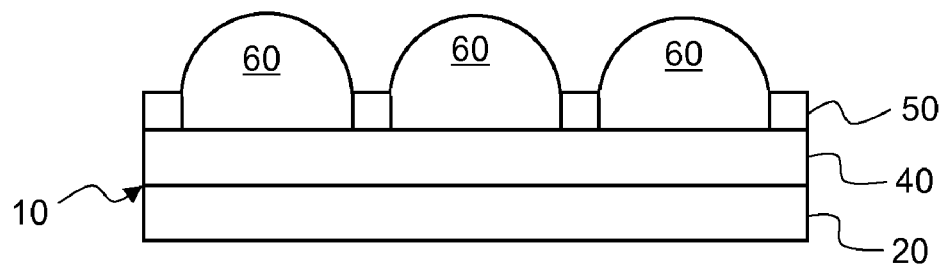
FIGS. 9A-9C show cross-sectional views of different micro-lens enabled elements exhibiting non-limiting example embodiments of various spherical and aspherical micro-lenses.
Figure 9B:
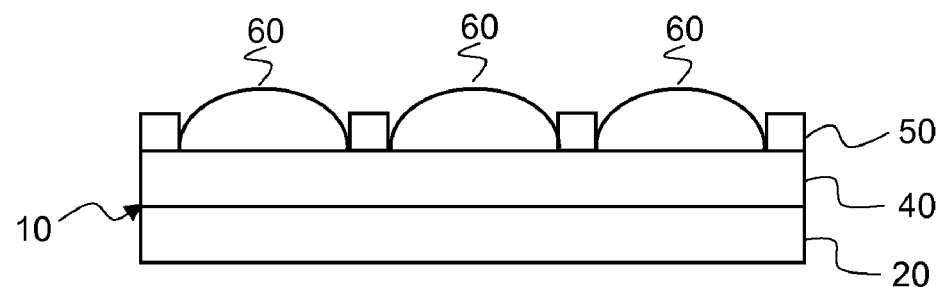
Figure 9C:
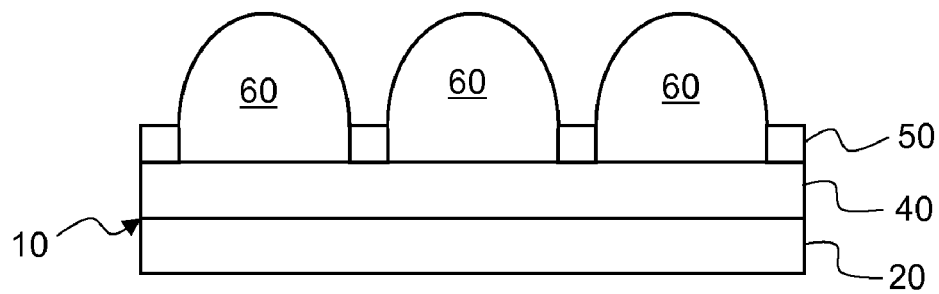

FIGS. 9A-9C show cross-sectional views of different micro-lens enhanced elements 10 exhibiting non-limiting example embodiments of various spherical and aspherical lenticular micro-lenses 60. FIG. 9A shows an embodiment wherein lenticular micro-lenses 60 comprise hemispherical lenses. FIGS. 9B and 9C show embodiments of micro-lens enhanced elements 10 having aspherical lenticular micro-lenses 60. Any of the above described array patterns can be defined in a manner that causes aspherical lenticular micro-lenses 60 to be formed. Further, any of the patterns of lenticular micro-lenses 60 can be applied in a non-close packed manner. As is known in the art, lenticular micro-lenses 60 that have a non-cylindrical form will direct light to different viewing areas along multiple axes.

The invention has been described in detail with particular reference to certain preferred embodiments thereof, but it will be understood that variations and modifications can be effected within the scope of the invention.

PARTS LIST 10 micro-lens enhanced element
20 substrate
22 first surface
24 interlaced image
30 image elements
32 image strips
34 image strip sequence
40 transparent layer
42 proximate surface
44 distal surface
46 low surface energy material layer
50 pattern of low surface energy material
52 low surface energy strip
60 lenticular micro-lens (lenticular lens)
60*a* first set of lenticular micro-lenses
60*b* second set of lenticular micro-lenses
62 upper surface 64 lower surface
68 viewer
70 plurality of different portions
72 plurality of different portions
74 viewing area
130 printing interlaced image elements on substrate
140 coating transparent layer over interlaced image elements
145 coating optically transparent layer of low surface energy material
150 imagewise ablating low surface energy material
160 forming micro-lenses on areas of transparent layer from which low surface
energy material has been ablated
162 coating micro-lens material over distal surface
164 drying, heating or irradiation with actinic radiation of micro-lens material
166 printing micro-lens material on areas of optically transparent layer from which low surface energy material has been ablated
167 modifying the viscosity of the micro-lens material
168 drying, heating or irradiation with actinic radiation of micro-lens material
200 micro-lens enhanced system
220 direction of motion of substrate
230 interlaced image printing subsystem
232 printing/coating unit
238 compression roller
240 transparent layer coating subsystem
242 printing/coating unit
248 compression roller
250 low surface energy material coating subsystem
252 printing/coating unit
258 compression roller
260 ablation subsystem
262 laser ablation head
268 compression roller
270 micro-lens material application subsystem
272 printing/coating unit
278 compression roller
300 lenticular element printing system
370 micro-lens material coating subsystem
372 printing/coating unit
378 compression roller

The invention claimed is:

1. A micro-lens enhanced element comprising:
a substrate having a first surface;
a plurality of sequences of at least two image elements printed on the first surface, each sequence containing image elements from more than one image;
a transparent layer having a proximate surface confronting the printed image elements and a distal surface separated from the proximate surface;
a plurality of micro-lenses formed onto the distal surface, one lens formed over each sequence of at least two image elements and wherein mutually adjacent micro-lens are separated from one another by an ablatable low surface energy material.

2. The micro-lens enhanced element of claim 1, wherein the micro-lenses comprise a cured optically transparent fluid.

3. The micro-lens enhanced element of claim 2, wherein the optically transparent fluid comprises an oligomer.

4. The micro-lens enhanced element of claim 3, wherein the oligomer is a urethane acrylate oligomer.

5. The micro-lens enhanced element of claim 4, wherein the urethane acrylate oligomer has a plurality of acrylate sequences per oligomer molecule.

6. The micro-lens enhanced element of claim 1, wherein the low surface energy material comprises a silicone compound.

7. The micro-lens enhanced element of claim 6, wherein the silicone compound is polymethyl siloxane.

8. The micro-lens enhanced element of claim 1, wherein the low surface energy material comprises an infrared dye.

9. The micro-lens enhanced element of claim 8, wherein the near infrared dye has substantially no absorption in the visible spectrum detectable by human eye.

10. The micro-lens enhanced element of claim 9, wherein the infrared dye comprises a near-infrared-absorbing dye prepared by condensation reactions with 4,5-dihydroxy-4-cyclopentene-1,2,3-trione.

11. A lenticular element comprising:
a substrate having a first surface;
a plurality of sequences of at least two image strips on said first surface, each sequence containing image strips from more than one image;
a plurality of lenticular lenses with each lens having a base surface positioned to receive light that has been modulated by one of the plurality of sequences of the image strips;
a curved surface determined by a convex meniscus extending from a first low surface energy strip that is aligned with an edge of one of the sequences of at least two image strips to a second low surface energy strip that is aligned with another edge of the one of the sequences of at least two image strips, and wherein mutually adjacent lenticular lenses are separated from one another by an ablatable low surface energy material; and
wherein the low surface energy material comprises a near infrared dye.

12. The lenticular element of claim 11, wherein the plurality of lenticular lenses is located on the same side of the first surface as the image strips.

13. The lenticular element of claim 11, comprising a coated transparent layer between the image strips and the plurality of lenticular lenses.

14. The lenticular element of claim 11, wherein the convex meniscus is a meniscus of a cured optically transparent fluid.

15. The lenticular element of claim 11, wherein the convex meniscus is a meniscus of a cured fluid form of a lenticule forming material comprising an oligomer.

16. The lenticular element of claim 15, wherein the oligomer is a urethane acrylate oligomer.

17. The lenticular element of claim 16, wherein the urethane acrylate oligomer has a plurality of acrylate sequences per oligomer molecule.

18. The micro-lens enhanced element of claim 11, wherein the near infrared dye has substantially no absorption in the visible spectrum detectable by human eye.

19. The micro-lens enhanced element of claim 11, wherein the near infrared dye comprises a dye prepared by condensation reactions with 4,5-dihydroxy-4-cyclopentene-1,2,3-trione.

* * * * *